Jan. 10, 1928.

A. E. WEINGARTNER ET AL 1,656,028

STEERING GEAR

Filed Nov. 24, 1924

Inventors:
George E. Smith.
Anthony E. Weingartner
by their Attorneys
Howson & Howson

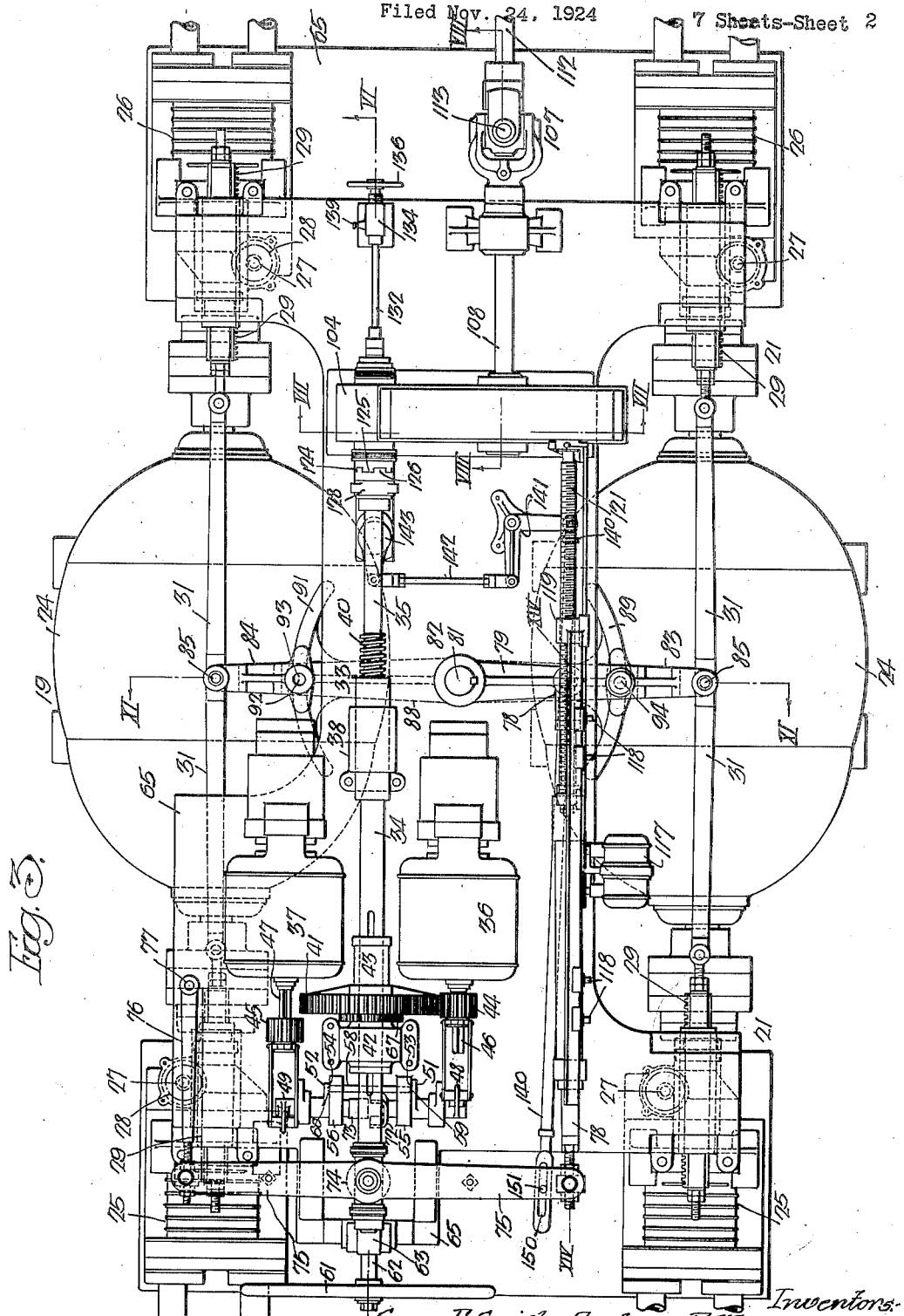

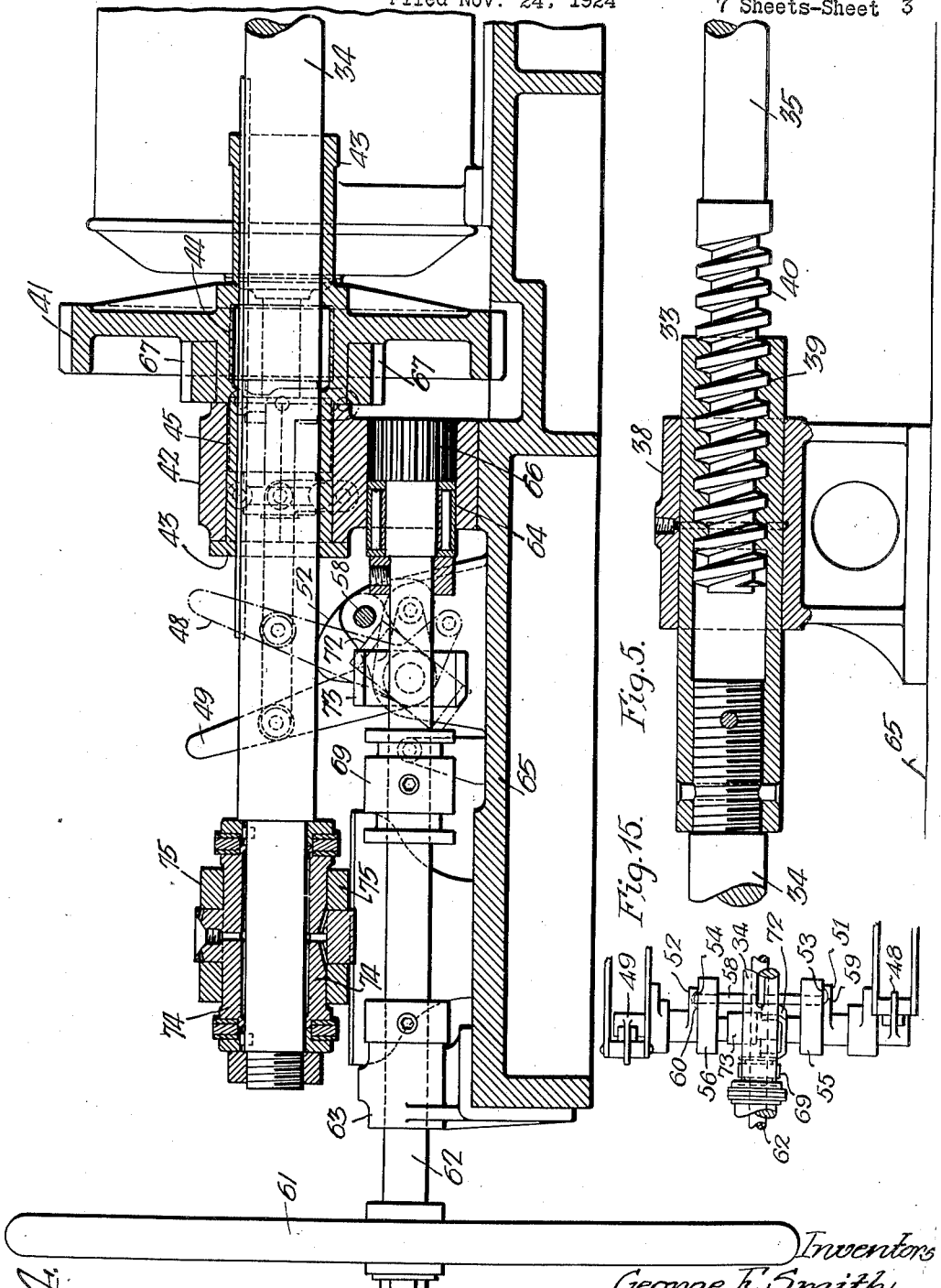

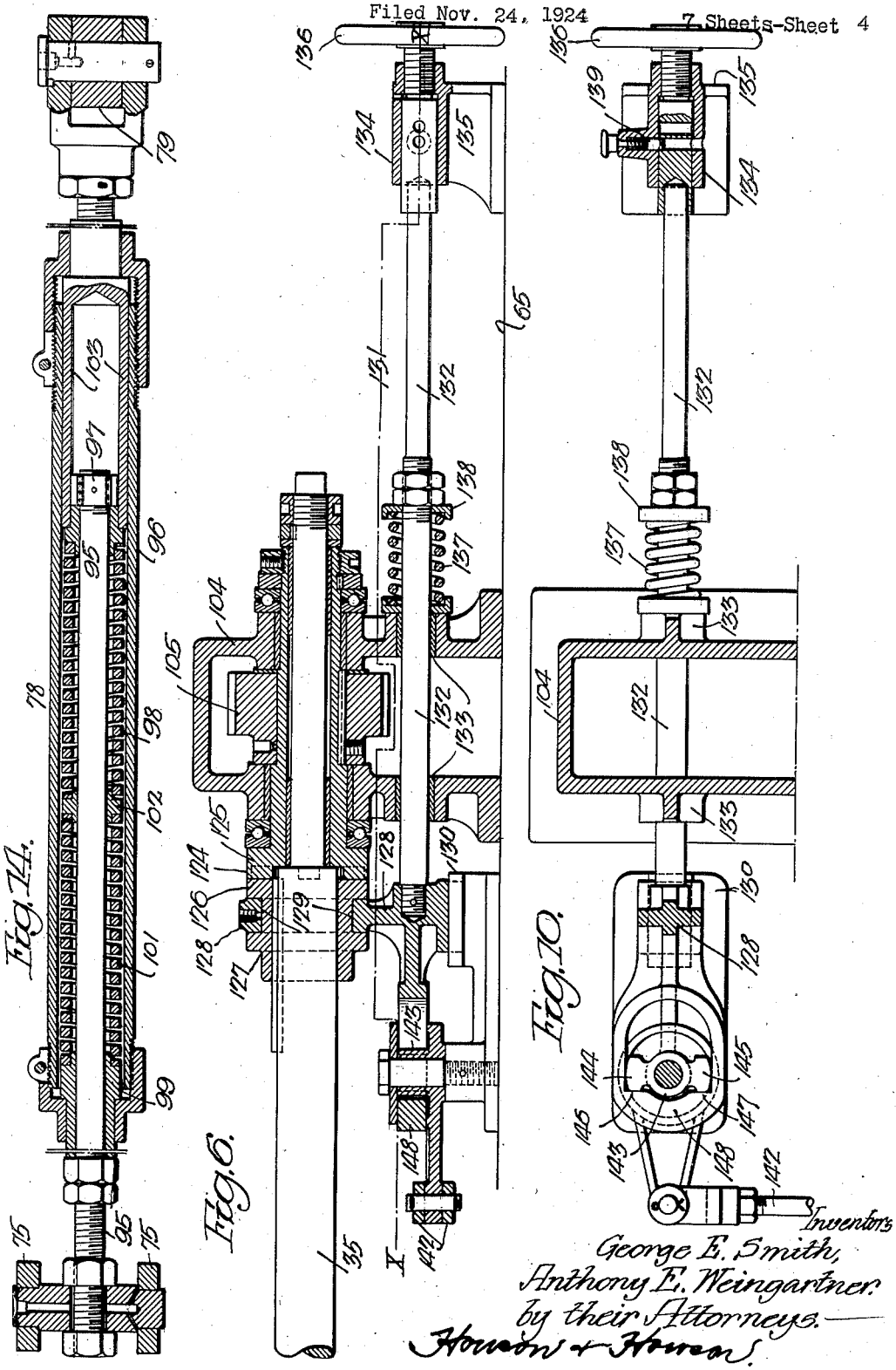

Jan. 10, 1928. 1,656,028
A. E. WEINGARTNER ET AL
STEERING GEAR
Filed Nov. 24, 1924 7 Sheets-Sheet 5

Inventors.—
George E. Smith,
Anthony E. Weingartner,
by their Attorneys.

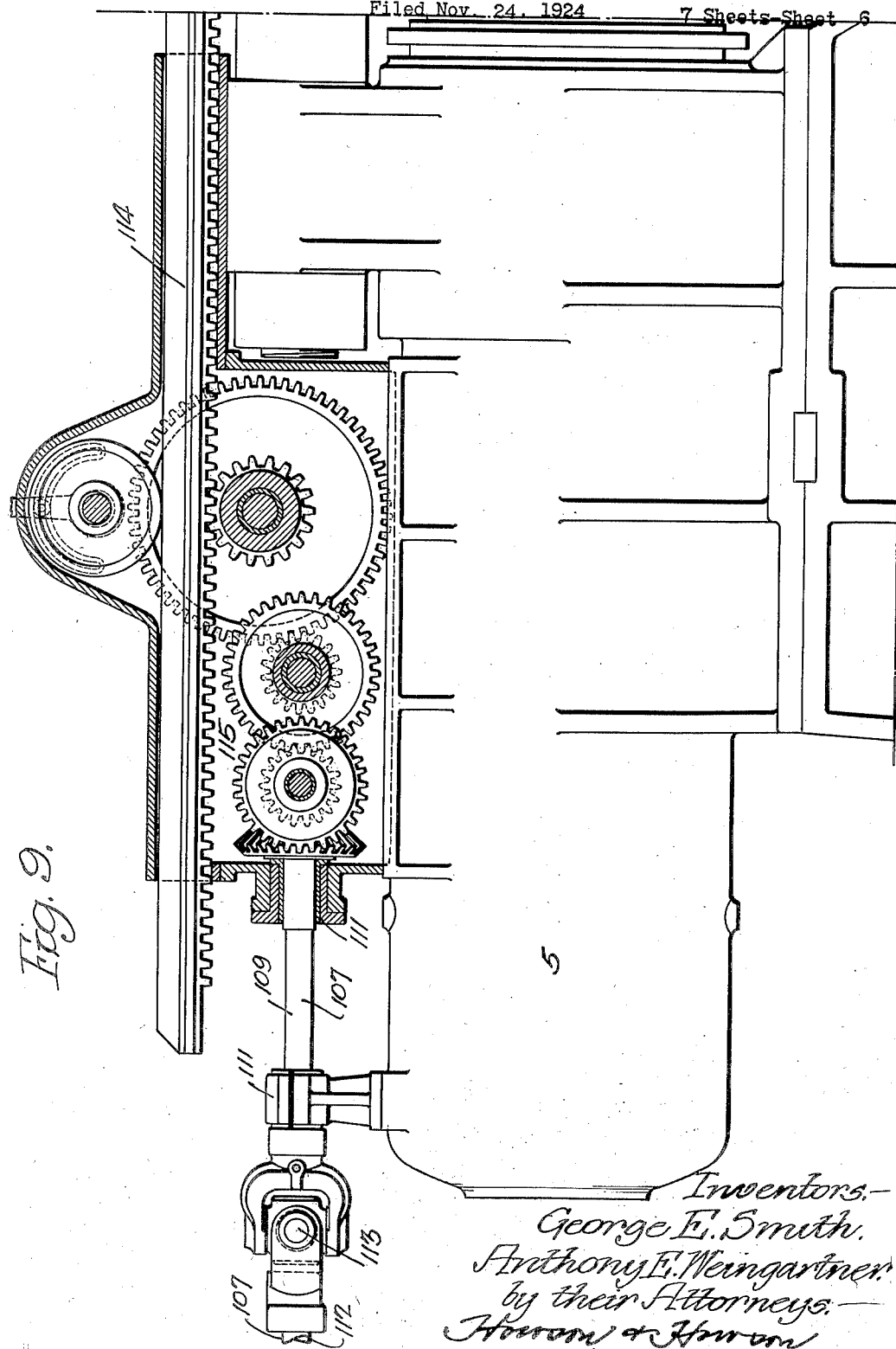

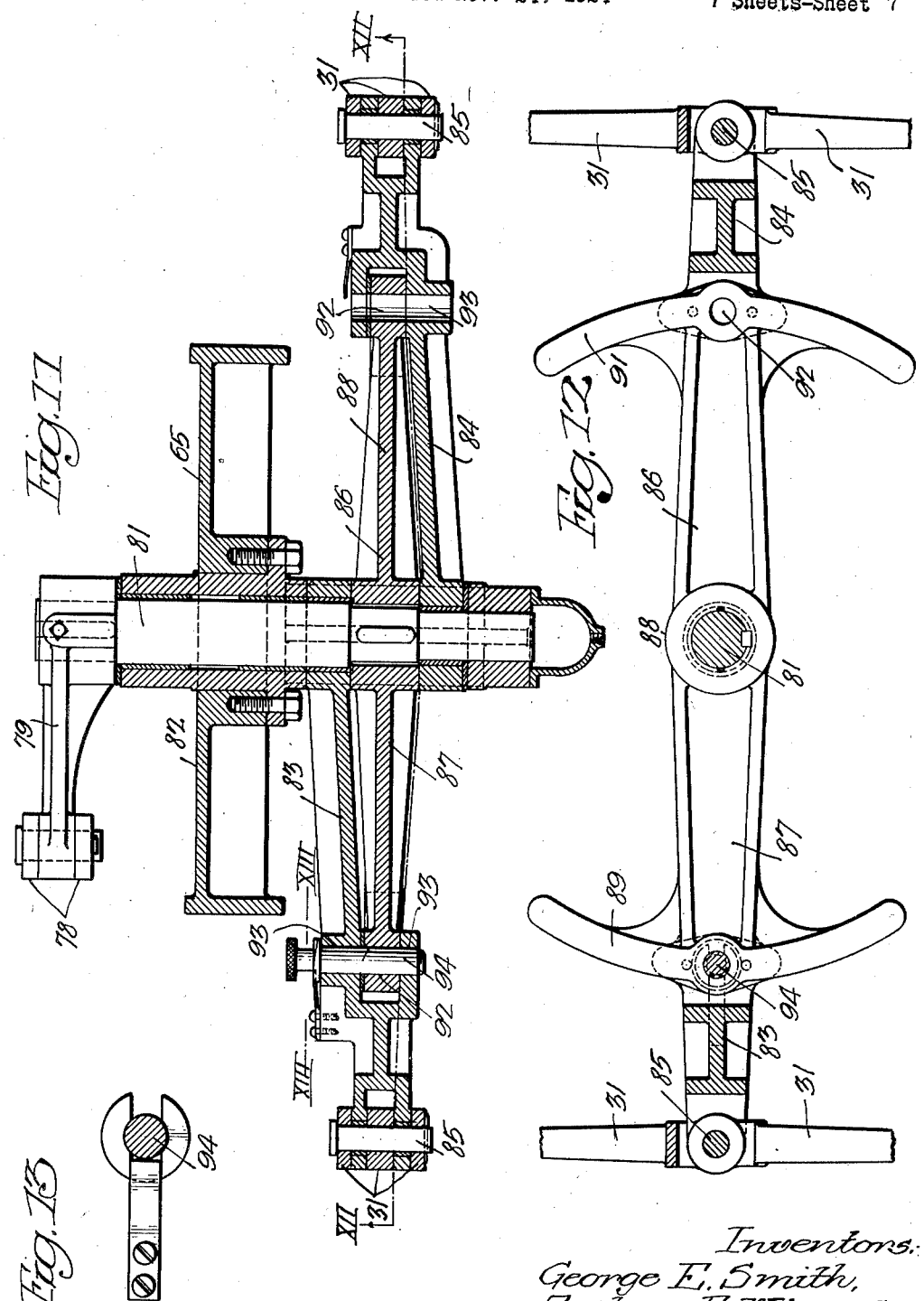

Patented Jan. 10, 1928.

1,656,028

UNITED STATES PATENT OFFICE.

ANTHONY EMIL WEINGARTNER, OF BETHLEHEM, PENNSYLVANIA, AND GEORGE EDWARD SMITH, OF CHARLOTTESVILLE, VIRGINIA, ASSIGNORS TO AMERICAN ENGINEERING COMPANY, OF PHILADELPHIA, PENNSYLVANIA, A CORPORATION OF PENNSYLVANIA.

STEERING GEAR.

Application filed November 24, 1924. Serial No. 752,071.

Our invention relates to hydraulic apparatus, and it has particular relation to hydraulic steering-gear systems.

One object of our invention is to provide an improved hydraulic steering-gear system, which includes safety mechanism adapted to prevent the apparatus from operating beyond a predetermined safe limit.

Another object of our invention is to provide a system of control involving a pilot motor, floating gear, follow-up mechanism, and a safety device designed to prevent an undesirable actuation of the control apparatus either by the pilot motor or by the fluid motors.

A further object of our invention is to provide in a fluid power system, a fluid motor, a pump operatively associated therewith, control means for the pump, and follow-up mechanism operatively associated with the control means, the follow-up mechanism including a clutch responsive to predetermined conditions in the fluid power system.

A still further object of our invention is to provide a safety clutch in the follow-up mechanism of a hydraulic steering system, whereby the fluid motors may be disconnected from the floating gear in the event that the range of movement of the floating gear exceeds a predetermined safe value.

With these and other objects and applications in mind, our invention further consists in the details of construction and operation and arrangement hereinafter described and claimed and illustrated in the accompanying drawings, wherein Fig. 1 is a plan view of the motor end of a hydraulic steering-gear system embodying our invention;

Fig. 3 is an enlarged detail top-plan view of the pump and associated control mechanism shown in Fig. 2.

Figs. 4, 5 and 6 are longitudinal sectional views taken on the line IV—VI of Fig. 3 and respectively illustrate the interlocking mechanism for the pilot motors and hand-wheel; the connection between the sleeve shaft and the screw shaft; and the safety clutch;

Fig. 9 is an enlarged detail sectional view showing the connection between the rotary follow-up shaft and the motor-operated rack and is taken on the line IX—IX, Fig. 1.

Fig. 10 is a detail horizontal sectional view taken on the line X—X of Fig. 6, illustrating the clutch operating mechanism and the manual control therefor;

Fig. 11 is a transverse sectional view taken on the line XI—XI of Fig. 3, showing the detachable connection between the pump controlling rods and the floating-gear mechanism;

Fig. 12 is a horizontal sectional view taken on the line XII—XII of Fig. 11;

Fig. 13 is a similar view taken on the line XIII—XIII of Fig. 11;

Fig. 14 is a longitudinal sectional view of a detail of the invention taken on the line XIV—XIV, Fig. 3; and Fig. 15 is an enlarged detail view of the interlocking mechanism for the pilot-motor pinions and the supplementary hand-operated pinions.

Figure 1:
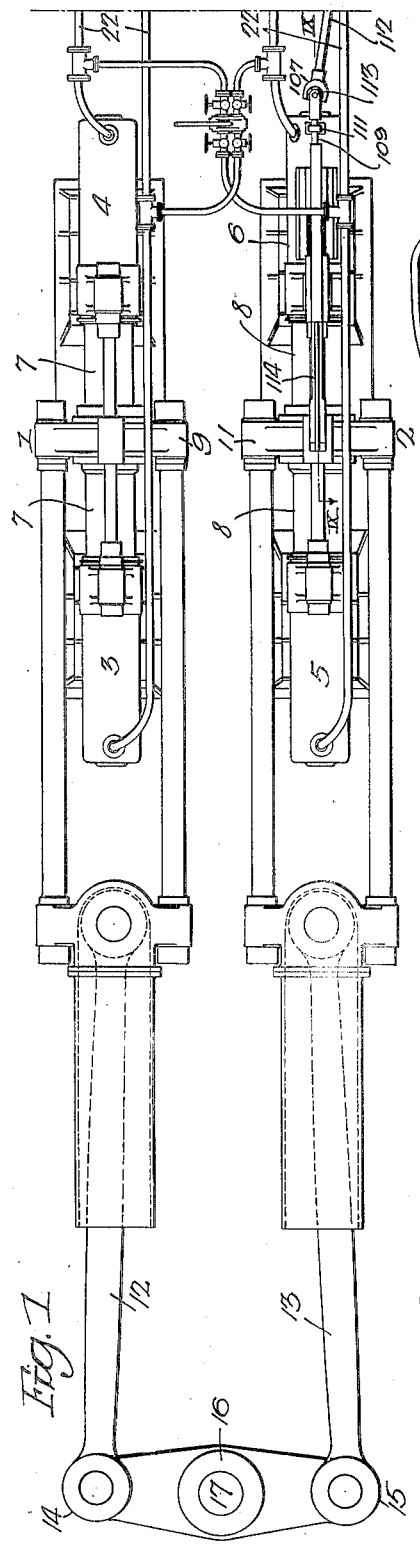
Figure 2:
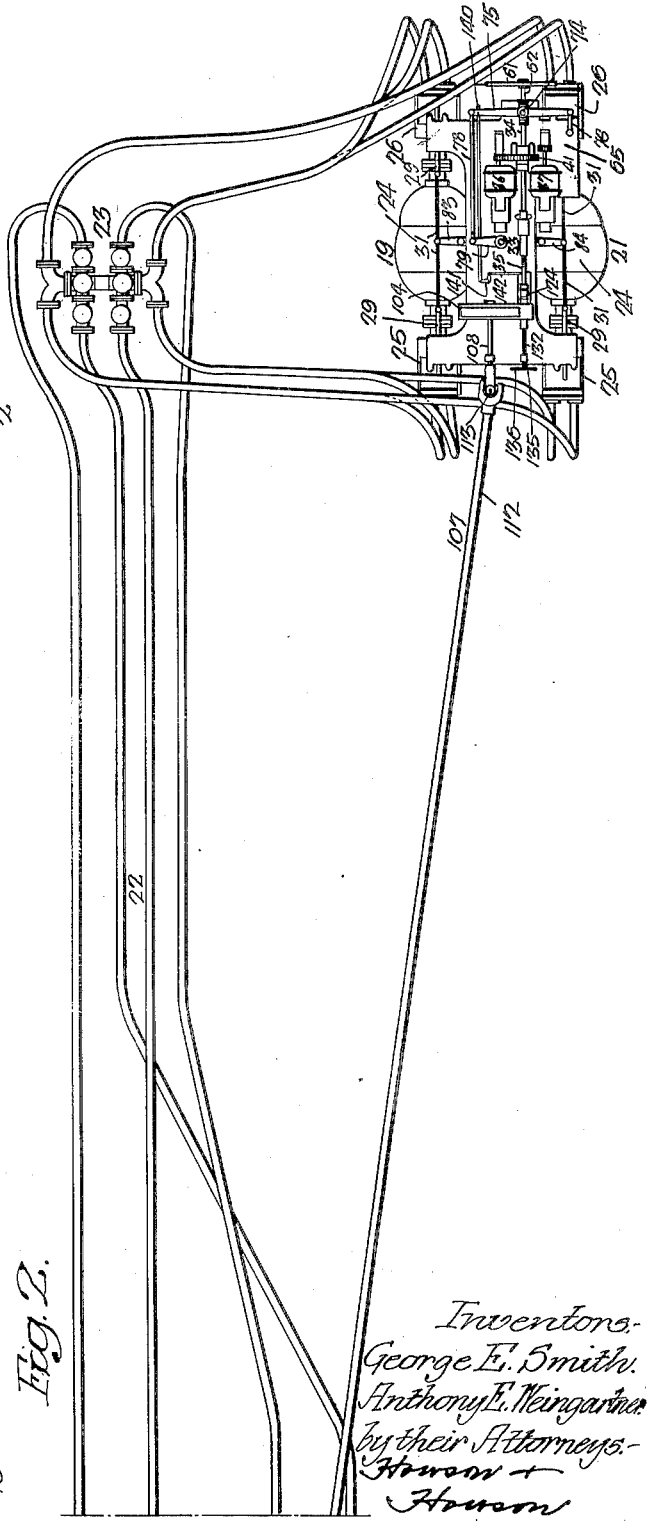
Fig. 2 is a view similar to Fig. 1 but showing the pump end of the system.
Figure 8:
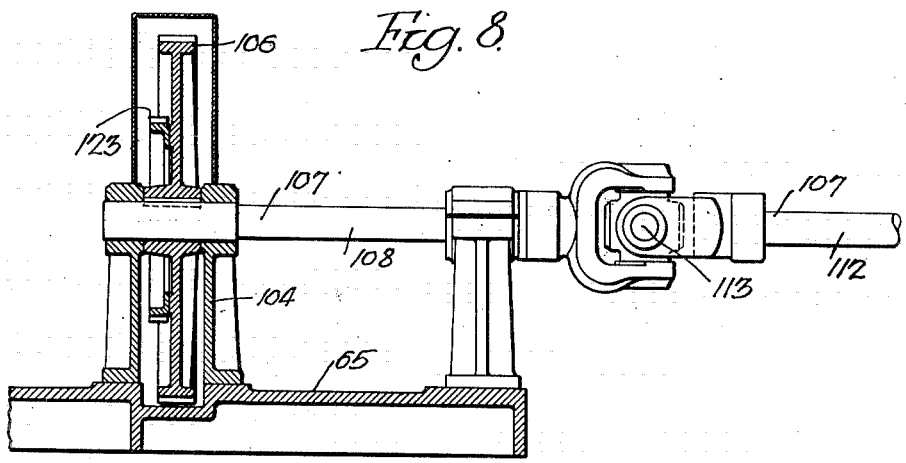
Fig. 8 is a longitudinal sectional view taken on the line VIII—VIII of Fig. 3.

In the illustrated form of embodiment of our invention shown in the drawing, a pair of hydraulic motors 1 and 2 comprising pairs of aligned cylinders 3, 4 and 5, 6 are respectively provided with rams 7 and 8 which are secured to cross-heads 9 and 11, the latter being connected by thrust rods 12 and 13 to ends 14 and 15 of a member 16 to be oscillated, say the tiller arms of a rudder post 17.

The motors 1 and 2 may be supplied with fluid under pressure from either of a pair of pump units 19, 21 through piping 22 controlled by a distributing valve 23 of usual design. Each pump unit comprises an electric motor 24 and a pair of pumps 25, 26 of the variable capacity type. Each of the pumps 25, 26 is provided with a control stem 27 for determining the stroke and hence the capacity of the pump. The upper end of each control stem 27 is provided with a pinion 28 which meshes with a longitudinally movable rack 29. The racks 29 of each unit may be connected by operating rods 31.

As hereinbefore noted, our invention contemplates a system of control, whereby one of the pump units 19, 21 may supply motive fluid to the motors 1 and 2 for a predetermined time only. To this end, we provide a so-called "pilot-control", involving the use of a two-part shaft 33, parts 34 and 35 of which are respectively connected to one of the hydraulic motors 1, 2, and to one of a pair of pilot motors 36, 37, all as will appear more fully hereinafter. The part 34 or so-called "sleeve-shaft" is rotatably and slidably mounted in a bearing 38 (Fig. 5), the portion in said bearing having a threaded boring 39 adapted to receive an adjacent threaded portion 40 of the screw-shaft part 35.

A gear wheel 41 (Figs. 3 and 4) is revolubly mounted in a bearing, 42, which also serves to support slidably the sleeve shaft 34, and it is provided with a hub portion 43 having a feathered connection to the longitudinally movable sleeve shaft 34. The gear wheel 41 may be actuated by either of a pair of pinions 44, 45 which are slidably mounted on shafts 46 and 47 extending respectively from the pilot motors 36 and 37. The pinions 44 and 45, of which the former is shown in engagement with the gear wheel 41, may be independently actuated by levers 48 and 49.

In order to insure the engagement of only one of the pinions 43, 44 with the gear wheel 41 at one time, we provide interlocking mechanism (Figs. 3, 4 and 15) in connection with the operating levers 48 and 49, said mechanism including a pair of flanged members 51 and 52 respectively connected to said levers 48 and 49 and so disposed as to engage opposite sides 53 and 54 of supports 55 and 56, respectively. The supports 55 and 56 are interconnected by means of a slidable pin 58. The latter is adapted to extend partially into recesses 59 and 60 in the flanged members 51 and 52 when the latter are in a position wherein both of the pinions 44 and 45 are disengaged from the gear wheel 41.

When the parts are in such position, a movement of one of the operating arms, say 48, to cause the pinion 44 to move into engagement with the gear wheel 41, results in the slidable pin 58 moving from the recess 59 in the flange 51 into the recess 60 in the flange 52, thereby locking the latter in position and preventing a movement of the operating arm 49. Hence, it is apparent that the pinion 45 may not be actuated into engagement with the gear wheel 41 while the pinion 44 is in mesh therewith. However, when the operating lever 48 is actuated to cause the pinion 44 to disengage the gear wheel 41, the recess 59 in the flange 51 is moved into alignment with the end of the slidable pin 58 so that when the lever 49 is actuated, the pin 58 is forced from the recess 60 of the flange 52 into the recess 59 of the flange 51, thereby permitting the continued movement of the operating arm 49 and the resulting engagement of the pinion 45 and the gear wheel 41.

Should the pilot motors 36 and 37 fail to operate for any reason, it would become necessary to actuate the sleeve shaft 34 by a hand-wheel 61 (Figs. 3 and 4). The hand-wheel 61 is mounted on one end of a shaft 62 rotatably and slidably mounted on bearings 63 and 64 carried by a main supporting frame 65. A pinion 66 is mounted on the other end of the shaft 62 and it is adapted to engage a gear wheel portion 67 which is formed on the hub portion 43 of the main gear wheel 41. In order to avoid any possibility of the pinion 66 engaging the gear-wheel portion 67 when either of the pinions 44 and 45 are in mesh with the main gear wheel 41, a sleeve 69 is so mounted on the hand-wheel shaft 62 as to be movable into and out of telescopic engagement with a pair of jaws 72 and 73 extending inwardly from the flanges 51 and 52, respectively.

The disposition of the above parts is such that when the sleeve 69 is in telescopic engagement with the jaws 72 and 73, the pinion 66 is in mesh with the gear-wheel portion 67, but at the same time, the pinions 44 and 45 are out of mesh with the gear wheel 41. Thus, with the sleeve 69 in said telescopic engagement, it is impossible for either of said pinions 44, 45 to be actuated. Moreover, when the pinion 66 has been moved into the ineffective position shown in Fig. 4 and one of the pinions 44, 45, say the former, has been actuated into engagement with the gear wheel 41, it is impossible to move the pinion 66 inasmuch as the jaw 72 is in engagement with the sleeve 69, locking the same in position. When the pinion 45 has been actuated into its effective position, the hand-wheel 61 is similarly locked by the jaws 73.

The end of the sleeve-shaft 34 opposite to the threaded boring 39 is journaled in a trunnion 74 adapted to provide a movable fulcrum for a floating lever 75. The floating lever 75 may be hinged at one end through a link 76 to a rigid support 77. The opposite end of the lever 75 is connected through shock absorbing means 78 (Fig. 14) to a pump-control lever 79. The latter is mounted on the upper end of a shaft 81 vertically positioned on a portion 82 of the main frame 65.

In view of the fact that it is necessary to operate only one of the pumping units 19, 21 at a time, the shaft 81 may be mechanically connected to one or the other of the pump-control rods 31, 31 by mechanism comprising levers 83 and 84, which are loosely mounted on the shaft 81 at spaced points and respectively secured to the pump-control rods 31, 31 by pins 85. A lever 86 is keyed to the shaft 81 at a point intermediate the bearing points of the levers 83, 84 and it is provided with oppositely extending arms 87 and 88 having transversely extending cross arms 89 and 91, respectively. The latter in effect constitute bearing surfaces for the arms 83, 84 and they are provided with centrally disposed perforations 92 adapted to align with perforations 93 in the levers 83, 84. A locking pin 94 may thus be disposed in corresponding pairs of perforations 92, 93 in order to lock mechanically the shaft 81 to the desired one of the levers 83, 84. An advantage of the coupling just described is that the operating shaft 81 may be quickly disconnected from either of the pump-control rods 31, 31 by simply removing the single coupling pin 94.

The shock absorbing means 78 is designed to prevent the pump vibration from being transmitted through the vertical operating shaft 81 to the floating lever 75, and it comprises a rod 95 (Fig. 14), one end of which is secured to the floating lever 75 and the other end of which is disposed in a tubular member 96. The inner end of the rod 95 is provided with an abutment 97 and a spring 98, while the other end thereof is provided with an abutment 99 for a spring 101; the adjacent ends of the two springs 98 and 101 being separated by a spring-seat 102. The abutment 97 engages a tubular member 103 which extends from the cylinder 96 and is mechanically connected to the lever 79.

The end of the screw shaft 35 opposite to the threaded portion 40 is mounted in a housing 104 (Fig. 6) for rotative movement only. A pinion 105 is keyed to a portion of the shaft 35 within the housing 104 and it is operably associated by means of a gear wheel 106 with a so-called "follow-up shaft" 107. The shaft 107 may comprise a portion 108, which is secured to the gear wheel 106, a portion 109, which is revolubly mounted in bearings 111 supported on one of the hydraulic cylinders, and an intermediate portion 112 having ball-and-socket connections 113 with the shaft portions 108 and 109. The follow-up shaft 107 may be revolved in accordance with the actuation of the motors 1, 2 by means of a rack 114, (Fig. 9) which is secured to the cross-head 11, and associated gearing 115.

Assuming the pinion 44 in mesh with the gear wheel 41 and the locking pin 94 in the position shown in Fig. 11, the energization of the pilot motor 36 causes the rotation of the sleeve shaft 34, since the screw shaft 35 is held stationary by the follow-up mechanism which connects the same to the hydraulic motors 1, 2. The threaded boring 39 in the end of the sleeve shaft 34 thus functions as a nut for the stationary screw shaft 35, causing the floating gear, which includes the sleeve shaft 34 and the floating lever 75, to move to the left. As a result, the floating lever 75 fulcrums on the link 76 and the opposite end thereof through the flexible connection 78 serves to move the lever arms 79 and 83 and, hence, the valve-control rod 31 of unit 21.

The movement of the valve-control rod 31 actuates the control stems 27 of the pumps 25, 26 from the neutral position and causes fluid under pressure to be propelled through the distributing valve 23 and piping 22 to certain of the cylinders of the hydraulic motors 1, 2, say, for example, cylinders 4 and 5, whereupon the rudder tiller arms 16 and post 17 are moved in the desired direction. The movement of the rack 114 incident to the operation of the rudder tiller arms 16 causes the follow-up shaft 112 to revolve and hence the screw shaft 35. The gear ratios involved in the follow-up mechanism are such that the rotative speed of the screw shaft 35 synchronizes with that of the sleeve shaft 34. As a result, further longitudinal movement of the sleeve shaft 34 to the left is avoided, and the rudder post 17 continues to turn in the desired direction.

When the operation of the rudder post 17 is to be interrupted, the pilot motor 36 is deenergized and the sleeve shaft 34 accordingly brought to a stop. The rudder post 17, however, continues to turn and the screw shaft 35 continues to rotate. Inasmuch as the sleeve shaft 34 cannot revolve, the operation of the screw shaft 35 causes the sleeve shaft 34 and the floating lever 75 to be moved longitudinally to the right, and this movement through the flexible connection 78 and control levers 79 and 83 causes the pump-control stems 27 to be returned to their neutral position, whereupon the rudder post 17 is brought to a stop. Hence it is apparent that the rudder post 17 is actuated so long as one of the pilot motors 36, 37 continues to turn the sleeve shaft 34, but when said pilot motor becomes inoperative, the rudder post 17 is automatically brought to a stop.

Figure 7:
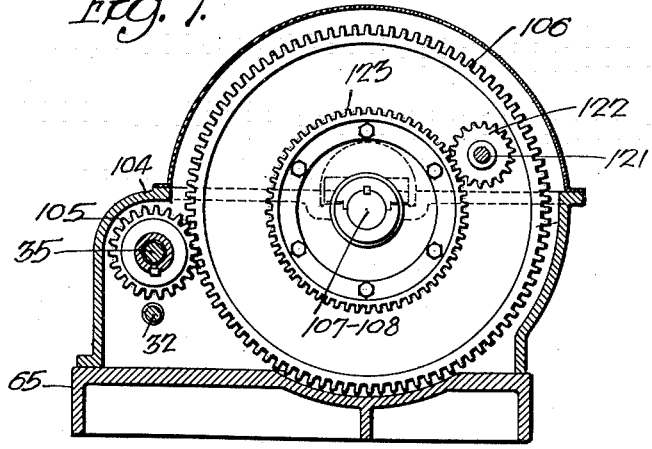
Fig. 7 is a transverse sectional view taken on the line VII—VII of Fig. 3.

The stroke of the motors 1 and 2 may be limited to a safe value by a limit switch 117 (Fig. 3) which controls the operation of the pilot motors 36 and 37. The switch 117 may be actuated by movable dogs 118 movable longitudinally by a nut 119 carried by a revoluble screw 121. The latter carries at one end a driving pinion 122 (Fig. 7) which meshes with a gear wheel 123 secured to the main gear wheel 106.

With the apparatus as above-described, should one of the pilot motors 36, 37 be started with the pump 25, 26 out of action, the sleeve shaft 34 and the floating lever 75 would be moved bodily to the right or to the left an excess amount with consequent damage thereto. Or should the rudder post 17 by reason of the excessive force of a heavy wave cause a movement of motors 1 and 2, then the consequent rotation of the screw shaft 35 in the threaded portion 39 of the now stationary sleeve shaft 34 would cause a longitudinal movement of the shaft 34 and this movement if continued would also result in damage to the floating gear.

According to our invention, safety mechanism is provided for avoiding the above-mentioned undesired results, said mechanism comprising a safety clutch 124 (Figs. 6 and 10) which is included in the follow-up mechanism. The clutch 124 comprises jaws 125 and 126, of which the former is secured directly to the pinion 105. The other jaw 126 is an integral part of a collar 127 which is splined to an adjacent portion of the screw shaft 35.

The clutch collar 127 may be actuated by a yoke 128 disposed in a circular recess 129 in the outer surface thereof. The yoke 128 has a foot which is slidably mounted on a supporting base 130 and it may be so actuated as to engage and disengage the cooperating clutch jaws 125 and 126 by means of a hand-control mechanism 131. The latter comprises a shaft 132 which extends through bearings 133 to a bearing 134 in a supporting frame 135. A hand-wheel 136 may be used to operate manually the rod 132. The rod 132 may be secured in its clutch engaging or disengaging positions by means of a spring controlled locking pin 139. A spring 137 disposed between one of the bearings 133 and an abutment 138 on the rod 132 serves to maintain the clutch jaws 125 and 126 in their normally engaged position.

The clutch jaws 125 and 126 may be automatically operated in the event of an excess movement of the sleeve shaft 34 by means of linkage comprising a rod 140 (Fig. 3) having a slot 150 in one end portion thereof adapted to receive a pin 151 extending from an adjacent end of the floating lever 75, all as will presently appear.

The rod 140 is connected by means of a bell-crank lever 141 and a rod 142 to a centrally pivoted member 143 (Figs. 6 and 10) having laterally extending arms 144 and 145. The arms 144 and 145 engage adjacent shoulder portions 146 and 147, respectively, of a projecting portion 148 of the slidable yoke member 128, whereby the latter may be moved longitudinally upon a turning movement of the centrally pivoted member 143 in either direction. Thus the clutch jaws 125 and 126 may be disengaged upon a longitudinal movement of the rod 140 and the size of the slot 150 is such that the pin 151 does not engage either end of the same to cause the operation of the clutch 124 until sleeve shaft 34 has moved an excessive amount.

Assume, for purposes of illustration, that the pumps 25 and 26 fail to operate in accordance with the actuation of the pilot motor 36. Then the screw shaft 35 remains stationary and the sleeve shaft 34 continues to move bodily, say to the left, until the pin 151 engages the end of the slot 150, whereupon the member 143 is actuated to cause the disengagement of the clutch jaws 125 and 126. The screw member 35 is now free to turn with the result that it revolves with the sleeve shaft 34 by reason of the frictional contact therewith. Further longitudinal movement of the sleeve shaft 34, therefore, is avoided, and the pilot motor 36 may operate indefinitely without causing damage to the control system.

Or, if we assume the condition wherein the pilot motor 36 is inoperative and the screw shaft 35 is actuated by reason of the force of a heavy wave on the rudder, then, when the floating lever 75 has moved the maximum safe amount, the pin 151 engages the end of the slot 150, causing the clutch jaws 125 and 126 to be disengaged, whereupon the pinion 105 may revolve free of the screw shaft 35 and thus avoids a further longitudinal movement of the sleeve shaft 34.

While we have shown only one form of embodiment of our invention, for the purpose of describing the same and illustrating its principles of construction and operation, it is apparent that various changes and modifications may be made therein without departing from the spirit of our invention, and we desire, therefore, that only such limitations shall be imposed thereon as will be indicated in the appended claims or as are demanded by the prior art.

We claim:

1. In a fluid power system, the combination with a fluid motor, of a pump operatively associated therewith, a pilot motor and follow-up mechanism for controlling the operation of said pump, and means adapted to render ineffective said follow-up mechanism upon the continued movement of said pilot motor with said fluid motor inoperative.

2. Apparatus comprising a pump, a fluid motor connected to be actuated by said pump, means including a pilot motor and follow-up mechanism for controlling the operation of said pump, and means for rendering ineffective said follow-up mechanism upon the continued operation of said fluid motor with said pilot motor inoperative.

3. In a hydraulic system, the combination with a fluid motor, of a pump, mechanism including a pilot motor and floating gear for controlling the operation of said pump, and follow-up mechanism operably associating said floating gear and said fluid motor, said follow-up mechanism including a clutch adapted to render ineffective said pilot motor under certain operating conditions.

4. A motor, a pump, floating gear for controlling said pump, and follow-up mechanism operatively associating said floating gear and said motor, said mechanism including a clutch.

5. A motor, a pump, floating gear for controlling said pump, follow-up mechanism operatively associating said floating gear and said motor, said mechanism including a clutch, and clutch-actuating means operable upon a predetermined range of movement of said floating gear.

6. Apparatus comprising a fluid motor, a pump for actuating the same, control mechanism for said pump including a pilot motor and floating gear, follow-up mechanism extending between said fluid motor and said control mechanism, said follow-up mechanism including a clutch, and means for operating said clutch, whereby the fluid motor and said follow-up mechanism may be disengaged from said floating gear upon a predetermined range of movement thereof.

7. In combination, a motor, means for actuating said motor, a pilot motor and floating gear for controlling said means, said floating gear including a floating lever and a longitudinally movable shaft having one end formed to constitute a nut, a shaft having a threaded portion adapted to cooperate with said nut, and means for causing said last-mentioned shaft to rotate upon a movement of said fluid motor, whereby said floating gear may be returned to its initial position upon the inoperation of said pilot motor.

8. In a system of control, the combination with a floating lever, of a bodily movable shaft for actuating the same, a shaft having a threaded portion, an adjacent portion of said bodily movable shaft being formed to constitute a nut for said threaded shaft portion, a motor, means including a clutch for operatively associating said threaded shaft and said motor, and means for causing the operation of said clutch upon a predetermined movement of said bodily movable shaft.

9. In a system of control, a floating lever, a bodily movable shaft for actuating said lever, a threaded shaft, one end of said bodily movable shaft being formed to constitute a nut for said threaded shaft, driving means for the latter, means for disconnecting said driving means from said threaded shaft, and means for actuating said disconnecting means upon a predetermined movement of said bodily movable shaft.

10. A system of control comprising a floating lever, a bodily movable supporting member therefor, a pilot motor for causing the rotation of said member, a shaft, said member having a threaded connection with said shaft, means for driving said shaft, means for disengaging the connection between said driving means and said shaft, and mechanism operable upon a movement of said member beyond a predetermined point to effect the operation of said disengaging means.

11. In a system of control, a shaft mounted for rotary and longitudinal movement, a pilot motor for causing the rotation of said shaft, a second shaft, means for causing the rotation thereof, said shafts being associated in such manner that said first-mentioned shaft is moved longitudinally upon a difference in the rotative speed of said shafts, a clutch for disengaging the connection between said second shaft and said driving means, a floating lever mounted on said first-mentioned shaft, and linkage interconnecting said floating lever and said clutch, whereby said clutch may be actuated upon the movement of said floating lever beyond a predetermined point in either direction.

12. In a system of control, a shaft mounted for rotary and longitudinal movement, a pilot motor for causing the rotation of said shaft, a threaded shaft cooperating with said first-mentioned shaft, whereby the latter may be moved longitudinally upon the rotation of the same, means for causing the rotation of said threaded shaft, a clutch for disengaging the connection between the latter and said driving means, a floating lever mounted on said first-mentioned shaft, linkage for so interconnecting said clutch and said floating lever that the former is actuated only upon a predetermined range of movement of said floating lever, and auxiliary hand-controlled mechanism for determining the effectiveness of said clutch.

13. In combination, a driven gear wheel, a pair of pilot motors having pinions movable into and out of engagement with said driven gear wheel, a hand-wheel having a pinion movable into and out of operative engagement with said driven gear wheel, and interlocking mechanism adapted to permit one or the other of said motor pinions or the hand-wheel pinion to engage said driven gear wheel at one time only.

14. In combination, a driven gear-wheel member, a pair of pilot motors having pinions movable into and out of engagement with said member, actuating means for said pinions, a hand-wheel provided with a pinion movable into and out of engagement with said gear-wheel member, and means whereby one of said pinions may engage said gear wheel at one time only.

15. Apparatus comprising a main shaft, a pair of pump-control rods disposed on opposite sides of said shaft, arms extending from said control rods and journaled on said shaft at spaced points, a third arm keyed to the portion of said shaft between said spaced points and provided with cross arms on the end portions thereof adapted to provide a supporting surface for said first-mentioned arms, adjacent arms being provided with aligned perforations, and a pin adapted to be disposed in one or the other pair of perforations, depending upon which of said pair of pump rods is to be actuated by said main shaft.

16. In a fluid power system, the combination with a fluid motor, of a pump operatively associated therewith, control means for said pump, and follow-up mechanism operatively associated with said control means, said mechanism including a clutch responsive to predetermined operating conditions in said fluid power system.

ANTHONY EMIL WEINGARTNER.
GEORGE EDWARD SMITH.